(12) United States Patent
Chen et al.

(10) Patent No.: US 8,878,965 B1
(45) Date of Patent: Nov. 4, 2014

(54) BLACK LEVEL ADJUSTMENT DEVICE AND METHOD FOR CMOS IMAGE SENSOR

(71) Applicant: Himax Imaging Limited, Tainan (TW)

(72) Inventors: Po-Chang Chen, Tainan (TW); Yuan-Chih Peng, Tainan (TW)

(73) Assignee: Himax Imaging Limited, Tainan (TW)

( * ) Notice: Subject to any disclaimer, the term of this patent is extended or adjusted under 35 U.S.C. 154(b) by 21 days.

(21) Appl. No.: 13/927,502

(22) Filed: Jun. 26, 2013

(51) Int. Cl.
*H04N 9/64* (2006.01)
*H04N 5/361* (2011.01)
*H04N 5/374* (2011.01)

(52) U.S. Cl.
CPC ............. *H04N 5/361* (2013.01); *H04N 5/374* (2013.01)
USPC .......................... 348/245; 348/222.1; 348/243

(58) Field of Classification Search
USPC ........ 348/245, 243, 241, 222.1; 382/254, 274
See application file for complete search history.

(56) References Cited

U.S. PATENT DOCUMENTS

| 5,659,355 | A  | * | 8/1997  | Barron et al. | 348/245 |
| 6,750,910 | B1 | * | 6/2004  | Bilhan        | 348/243 |
| 7,161,626 | B1 | * | 1/2007  | Nara          | 348/243 |
| 7,800,660 | B2 | * | 9/2010  | Ohara et al.  | 348/243 |
| 8,564,695 | B2 | * | 10/2013 | Moore         | 348/241 |
| 8,717,208 | B2 | * | 5/2014  | Moore         | 341/115 |

* cited by examiner

*Primary Examiner* — Nhan T Tran
(74) *Attorney, Agent, or Firm* — McClure, Qualey & Rodack, LLP

(57) ABSTRACT

A black level adjustment method for a CMOS image sensor is provided. The CMOS image sensor has a pixel array with dark rows and active rows. The method has the following steps of: computing an average value of pixels from the dark rows, wherein the average value is in the form of an integer and a fraction; calculating a black level control (BLC) offset value according to the integer; generating a dithering mask based on the fraction; applying the dithering mask to pixels from the active rows; and adding the calculated BLC offset value to the dithered pixels from the active rows to generate resulting pixels.

10 Claims, 10 Drawing Sheets

$$M = \begin{bmatrix} 0 & 8 & 2 & 10 \\ 12 & 4 & 14 & 6 \\ 3 & 11 & 1 & 9 \\ 15 & 7 & 13 & 5 \end{bmatrix}$$

FIG. 4A $$M = \begin{bmatrix} \textcircled{0} & 8 & \textcircled{2} & 10 \\ 12 & \textcircled{4} & 14 & \textcircled{6} \\ \textcircled{3} & 11 & \textcircled{1} & 9 \\ 15 & 7 & 13 & \textcircled{5} \end{bmatrix}$$

FIG. 4B $$Mdtr = \begin{bmatrix} 16 & 0 & 16 & 0 \\ 0 & 16 & 0 & 16 \\ 16 & 0 & 16 & 0 \\ 0 & 0 & 0 & 16 \end{bmatrix}$$

FIG. 4C $$D = \begin{bmatrix} 1 & 0 & 1 & 0 \\ 0 & 1 & 0 & 1 \\ 1 & 0 & 1 & 0 \\ 0 & 0 & 0 & 1 \end{bmatrix}$$

FIG. 4D $$M = \begin{bmatrix} 10 & 2 & 8 & 0 \\ 6 & 12 & 4 & 14 \\ 9 & 1 & 11 & 3 \\ 5 & 15 & 7 & 13 \end{bmatrix}$$

BLACK LEVEL ADJUSTMENT DEVICE AND METHOD FOR CMOS IMAGE SENSOR

BACKGROUND OF THE INVENTION

1. Field of the Invention

The present invention relates to black level control (BLC), and in particular relates to a black level adjustment device and method in a CMOS image sensor to perform BLC processing by using dithering.

2. Description of the Related Art

FIG. 1 illustrates a conventional CMOS image sensor pixel array. A CMOS image sensor (CIS) pixel array 100 may often comprise dark rows and active rows, as illustrated in FIG. 1. The pixels (e.g. R/B/Gr/Gb) in the CMOS image sensor pixel array 100 are arranged in the "Bayer Pattern". The dark rows 110 are fully shielded so that there is no light received, while the active rows 120 are used to receive the light rays or image incidents thereon. The dark rows are mainly used for calibrating pixel values in an analog front-end in the CMOS image sensor for proper black level output. A so-called black level control/cancellation (BLC) process may utilize the output pixel values of dark rows to reduce the bias/offset induced by the noise of the circuits of the CIS and the imperfect analog design.

Generally, taking one shot of a frame in the CIS may comprise the following steps: resetting and reading (exposure process) pixels of the dark rows; outputting the pixels of the dark rows for BLC processing; calibrating the analog circuit and adjusting the offset for proper black output level for BLC processing; freezing of the BLC setting at the end of the dark rows; resetting and reading the pixels of the active rows; performing BLC processing on the active row pixel values based on the frozen settings in the dark rows.

In addition, a general way to compensate for the bias is to firstly compute the average pixel value of the dark rows and then subtract the pixel values of the active rows by the average. The calculation of the average pixel value in the digital circuits in the BLC process inevitably possesses numerical errors owing to finite accuracy. In color sensors, the inevitably numerical errors in the color channels may cause significant color hue shifting, especially when the image signal processor (ISP) applies high channel gains to pixels of different color channels. Prior technologies may use a low-cost divider to compute an average value of dark rows. However, the inevitably numerical errors are not negligible and may cause color/brightness flashing; especially when the back-end ISP employs large channel gains for image processing.

BRIEF SUMMARY OF THE INVENTION

A detailed description is given in the following embodiments with reference to the accompanying drawings.

In an exemplary embodiment, a black level adjustment method for a CMOS image sensor is provided. The CMOS image sensor has a pixel array with dark rows and active rows. The method has the following steps of: computing an average value of pixels from the dark rows, wherein the average value is in the form of an integer and a fraction; calculating a black level control (BLC) offset value according to the integer; generating a dithering mask based on the fraction; applying the dithering mask to pixels from the active rows; and adding the calculated BLC offset value to the dithered pixels from the active rows to generate resulting pixels.

In another exemplary embodiment, a black level adjustment device for a CMOS image sensor is provided. The CMOS image sensor has a pixel array comprising dark rows and active rows. The black level adjustment device comprises: a computation unit, coupled to the dark rows, for calculating the average value of pixels from the dark rows, wherein the average value is in the form of an integer and a fraction, and the computation unit further calculates a black level control (BLC) offset value according to the integer; a mask generation unit, coupled to the computation unit, for generating a dithering mask based on the fraction; a dithering processing unit, coupled to the mask generation unit and the active rows, for applying the dithering mask to pixels from the active rows; and an offset calculating unit, for adding the calculated BLC offset value to the dithered pixels from the active rows to generate resulting pixels.

BRIEF DESCRIPTION OF THE DRAWINGS

The present invention can be more fully understood by reading the subsequent detailed description and examples with references made to the accompanying drawings, wherein:

FIG. 4A~4E illustrates the threshold map and the dithering masks used in the mask generation unit 220 according to an exemplary embodiment;

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
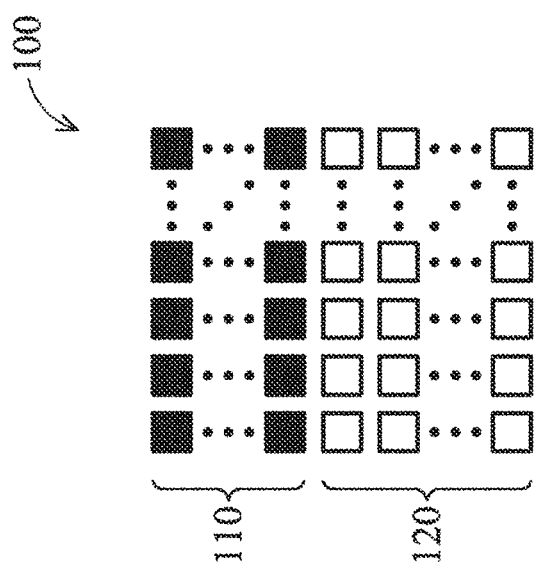
FIG. 1 illustrates a conventional CMOS image sensor pixel array.
Figure 2:
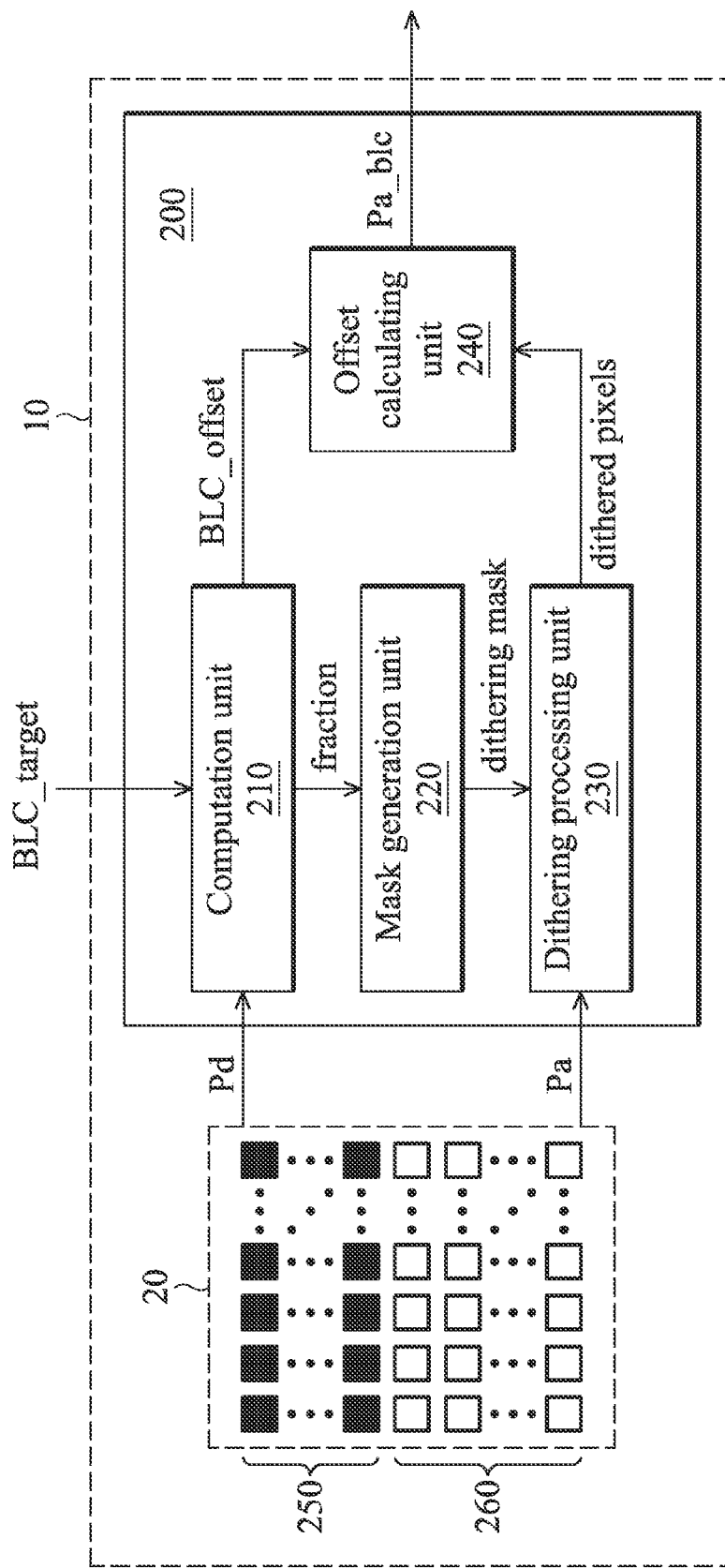
FIG. 2 illustrates a block diagram of the black level adjustment device in a CMOS sensor according to an exemplary embodiment.

FIG. 2 illustrates a block diagram of the black level adjustment device in a CMOS sensor according to an exemplary embodiment. The CMOS sensor 10 may comprise a black level adjustment device 200 and a pixel array 20 comprising dark rows 250 and active rows 260. In an embodiment, the black level adjustment device 200 may comprise a computation unit 210, a mask generation unit 220, a dithering processing unit 230, and an offset calculating unit 240. As illustrated in FIG. 2, Pd and Pa denote the retrieved pixel values from the dark rows 250 and the active rows 260, respectively, while BLC_target denotes a predetermined black level for the black level control processing. The computation unit 210 is coupled to the dark rows 250 of the pixel array 20 for calculating the average value of pixels from the dark rows 250, wherein the average value is in the form of an integer and a fraction. In practice, the output black level exceeding a specific range (e.g. 10~250) is not desired, and thus a user-defined black level (i.e. BLC_target) is set. The computation unit 210 may further calculate a black level control offset value BLC_offset by subtracting the integer from the predetermined black level BLC_target (i.e. a user-defined output black level). In addition, the user-defined output black level is optional and can be ignored by setting the value of BLC_target to zero. The mask generation unit 220 is coupled to the computation unit 210 for generating a dithering mask based on the fraction. The dithering processing unit 230 is coupled to the mask generation unit 220 and the active rows 260 of the pixel array 20, for receiving the dithering mask from the mask generation unit 220 and applying the dithering mask to pixels from the active rows 260. The offset calculating unit 240 is arranged for adding the calculated BLC offset value to the dithered pixels to generate the resulting pixels Pa_blc (i.e. the adjusted pixels of the active rows for later processing).

Figure 3:
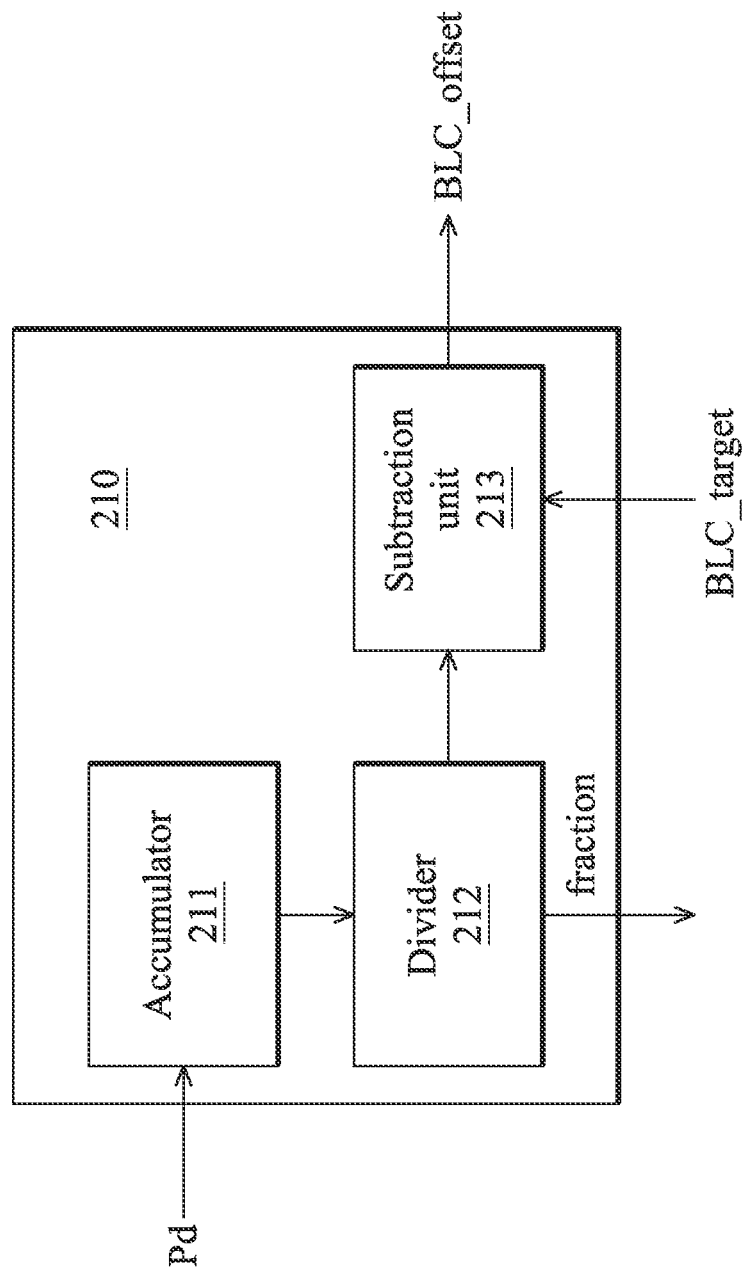
FIG. 3 illustrates a block diagram of the computation unit according to an exemplary embodiment.

FIG. 3 illustrates a block diagram of the computation unit 210 according to an exemplary embodiment. Referring to both FIG. 2 and FIG. 3, in an embodiment, the computation unit 210 may comprise an accumulator 211, a divider 212, and a subtraction unit 213. As illustrated in FIG. 3, the accumulator 211 is arranged for receiving the pixels Pd of the dark rows and calculating the summation value (i.e. accumulated value) of all the pixels Pd. The divider 212 is arranged for calculating an average value by dividing the summation value with the total number of received pixels Pd, wherein the average value may comprise an integer and a fraction. The divider 212 may output the fraction to the mask generation unit 220 for generating the dithering mask. The subtraction unit 213 is arranged for calculating the black level control offset value BLC_offset (i.e. may be positive or negative) by subtracting the integer from the predetermined black level. It should be noted that the calculated BLC offset value is used as the reference black level, and the pixel values from the active rows can be adjusted by the reference black level, thereby sustaining the consistency of colors when applying channel gains to different color channels (i.e. B, Gb, R, and Gr in the Bayer pattern).

FIGS. 4A~4E illustrates the threshold map and the dithering masks used in the mask generation unit 220 according to an exemplary embodiment. In an embodiment, the mask generation unit 220 may receive the fraction generated by the computation unit 210 and generate an intermediate dithering mask according to the fraction and the threshold map M, where the threshold map M is shown in FIG. 4A. For example, given that the fraction A is 7 (i.e. 0111 in binary), when the element in the threshold map M is smaller than the fraction A, the mask generation unit 220 may set the corresponding element in the intermediate dithering mask Mdtr to 16. Otherwise, the mask generation unit 220 may set the corresponding element in the intermediate dithering mask Mdtr to zero. The elements smaller than the fraction are marked in the threshold map M, as shown in FIG. 4B, and the corresponding intermediate dithering mask Mdtr is shown in FIG. 4C. The mask generation unit 220 may further generate the dithering mask D by dividing the intermediate dithering mask Mdtr with 16. In other words, the mask generation unit 220 may normalize the intermediate dithering mask Mdtr to generate the dithering mask D, as illustrated in FIG. 4D. Alternatively, the intermediate dithering mask can be ignored. In other words, the mask generation unit 220 may compare the pixels from the dark rows 250 with each corresponding element in the threshold map M. If the pixel is smaller than the corresponding element, the mask generation unit 220 may directly set the corresponding element to 1 in the dithering mask D. Otherwise, the mask generation unit 220 may directly set the corresponding element to zero in the dithering mask D. It should be noted that the order of the elements in the threshold map is not limited in the application. For example, every four consecutive numbers (e.g. 0~3, 4~7, 8~11 and 12~15) can be arranged symmetrically in different matrices (i.e. a square) in the threshold map M, as illustrated in FIG. 4E.

Figure 5:
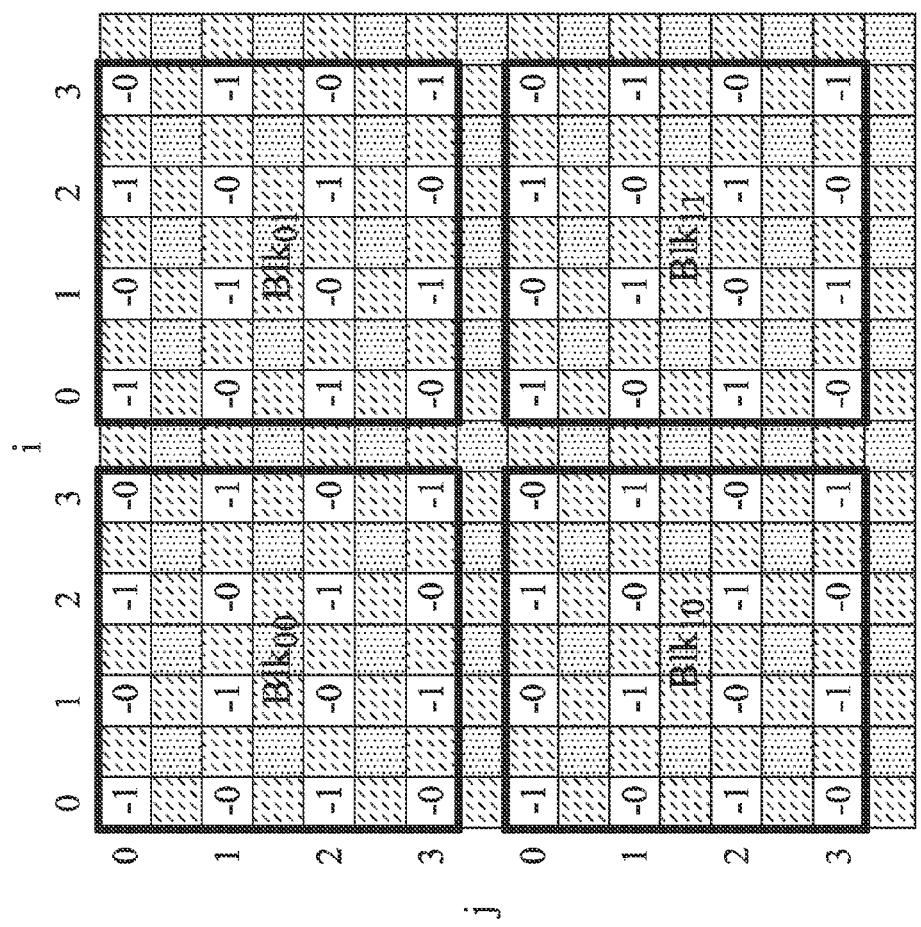
FIG. 5 illustrates a diagram of applying the dithering mask to pixels from the active rows according to an exemplary embodiment.

FIG. 5 illustrates a diagram of applying the dithering mask to B pixels from the active rows according to an exemplary embodiment, wherein i and j denote the horizontal and vertical coordinate of B pixels, respectively. Accordingly, the dithering processing unit 230 may receive the dithering mask from the mask generation unit 220, and apply the dithering mask to pixels of the active rows 260. Specifically, applying the dithering mask indicates that the dithering processing unit 230 subtracts the corresponding value (element) in the dithering mask from the pixels of the active rows 260. As illustrated in FIG. 5, the dithering processing unit 230 may subtract the corresponding value in the dithering mask from the B pixels in blocks Blk00, Blk01, Blk10, and Blk11. Subsequently, an adjusted frame can be obtained after processing all the blocks in a frame. It should be noted that the dithering processing unit 230 may perform a similar dithering process (i.e. applying the dithering mask) to pixels from other color channels (e.g. R/Gb/Gr).

Figure 6A:
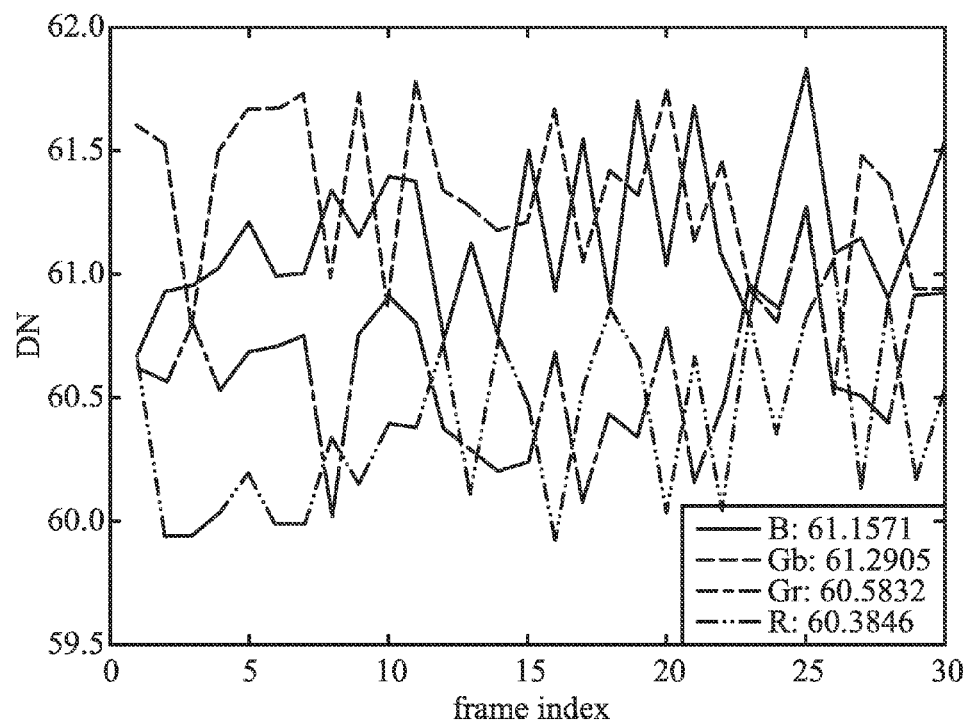
FIG. 6A~6C illustrates a simulation chart of a rounding method used in conventional BLC processing.
Figure 6B:
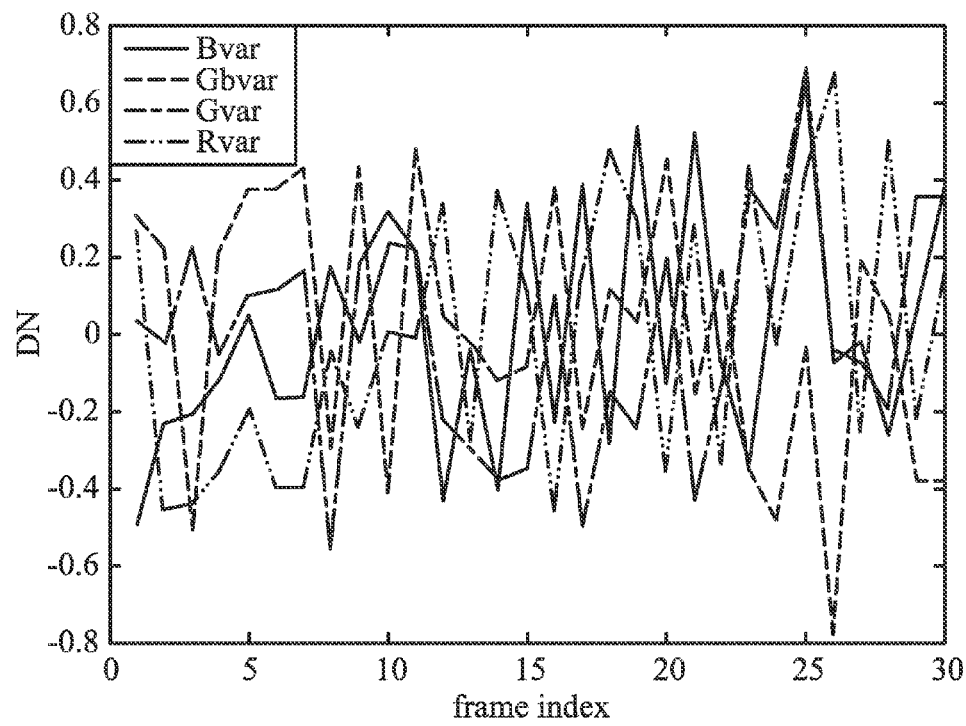
Figure 6C:
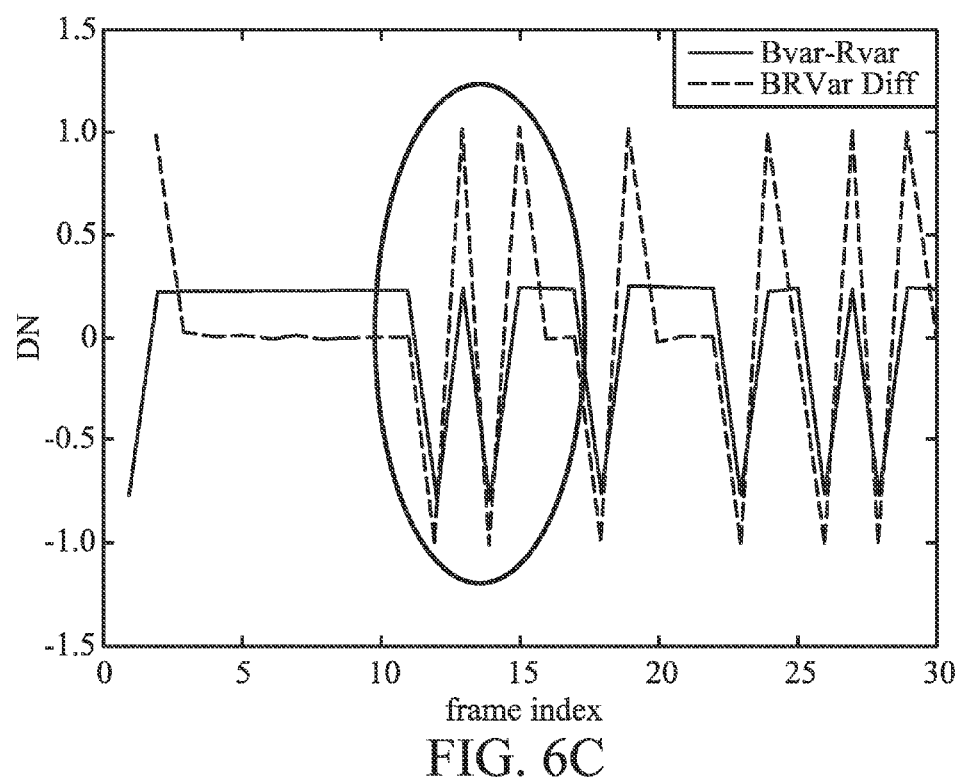
Figure 7A:
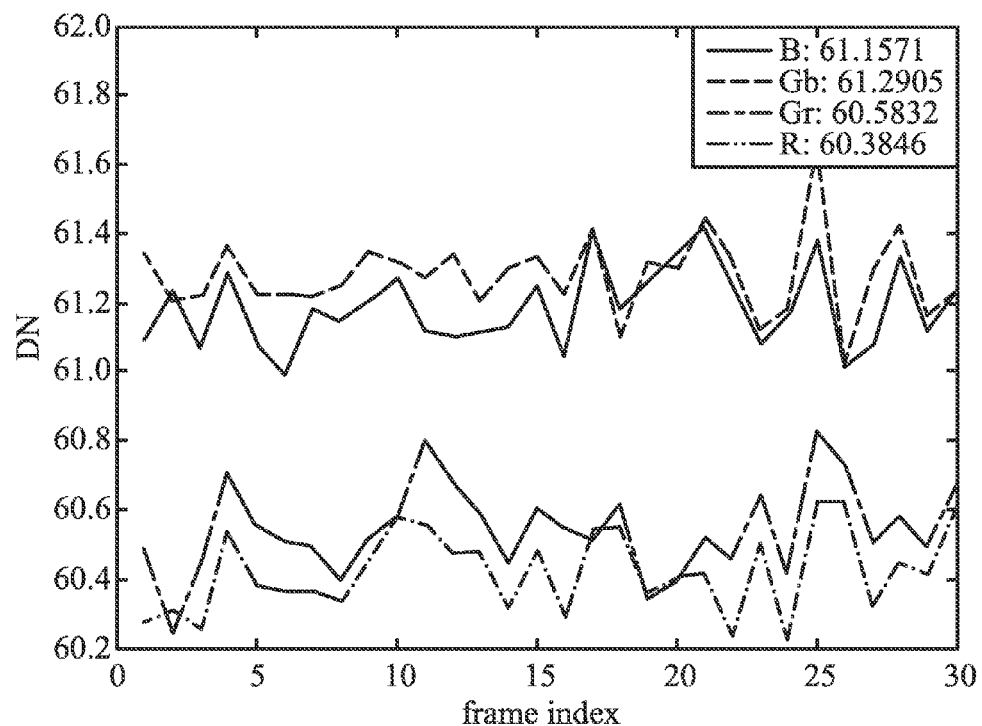
FIG. 7A~7C illustrates a simulation chart of dithering processing used in the black level adjustment device according to an exemplary embodiment.
Figure 7B:
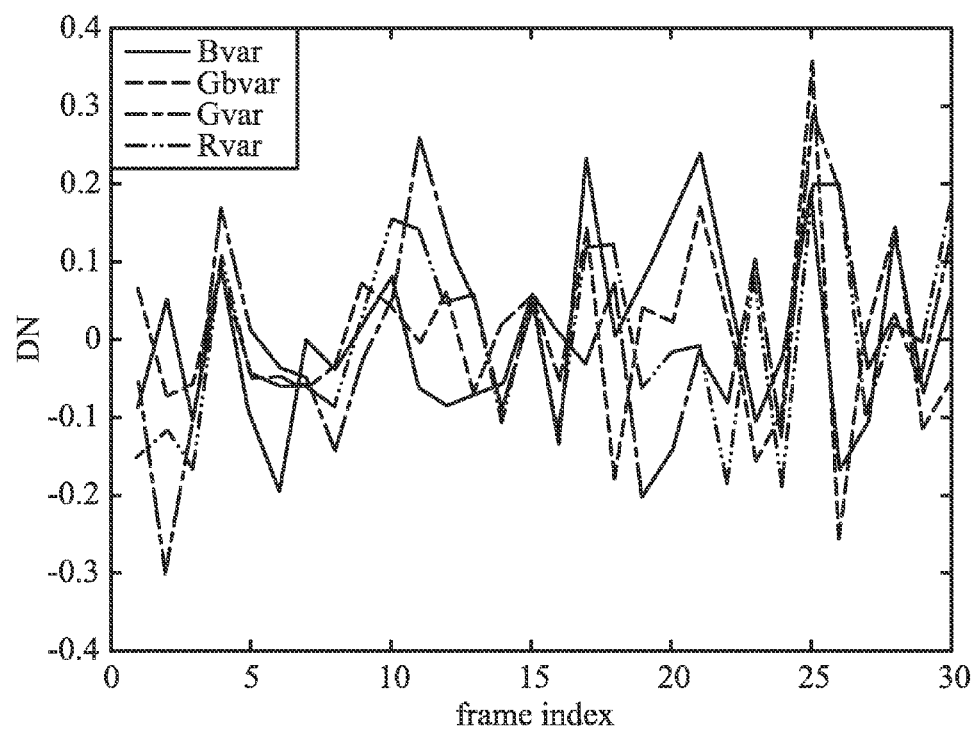
Figure 7C:
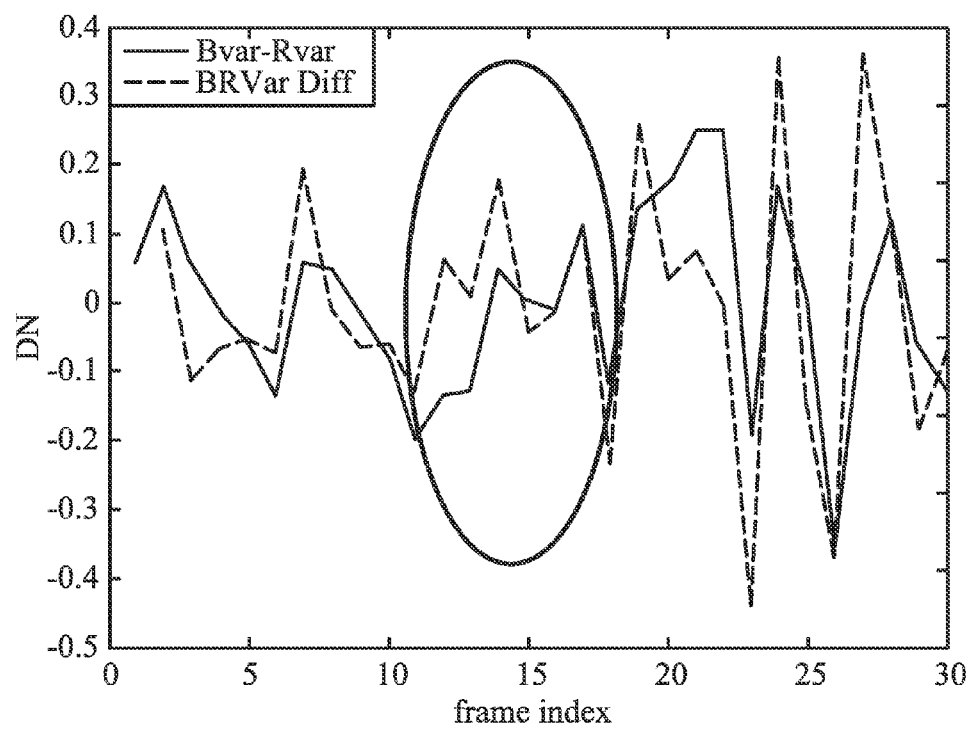

FIGS. 6A~6C illustrate a simulation chart of a rounding method used in conventional BLC processing. FIGS. 7A~7C illustrate a simulation chart of dithering processing used in the black level adjustment device according to an exemplary embodiment. The pixels of the dark rows in each color channel are captured. FIGS. 6A and 7A illustrate the black level in each color channel for 30 frames. FIGS. 6B and 7B illustrate the variance of the black level in each color channel for 30 frames. FIGS. 6C and 7C illustrate the difference between the B and R channel and the variance thereof. In prior technologies, the divider 213 in the computation unit 210 for the BLC processing is designed to be a fixed-point operation, which may use rounding (or truncation) on the fraction of the average value from the divider. Thus, the numerical error after the BLC processing (i.e. canceling the offset) can be up to 1 DN, as illustrated in FIG. 6B, wherein DN denotes a "digital number" (i.e. a base unit).

For example, the digital numbers (i.e. DN) can be 256 when the accuracy for each pixel is 8 bits. Since the BLC processing for each color channel (e.g. R/B/Gr/Gb) is performed independently, there are numerical errors in each color channel. Therefore, the differences between two color channels (e.g. R and B channel) can be up to 2DN (±1DN), as illustrated in FIG. 6C, the differences may cause significant color hue shifting, or color/brightness flashing. In the application, the numerical errors (i.e. the variance) in each color channel can be reduced to 0.4DN approximately by using the dithering processing, as illustrated FIG. 7C, and hence the difference between each two color channel can be reduced to 0.8DN.

Figure 8:
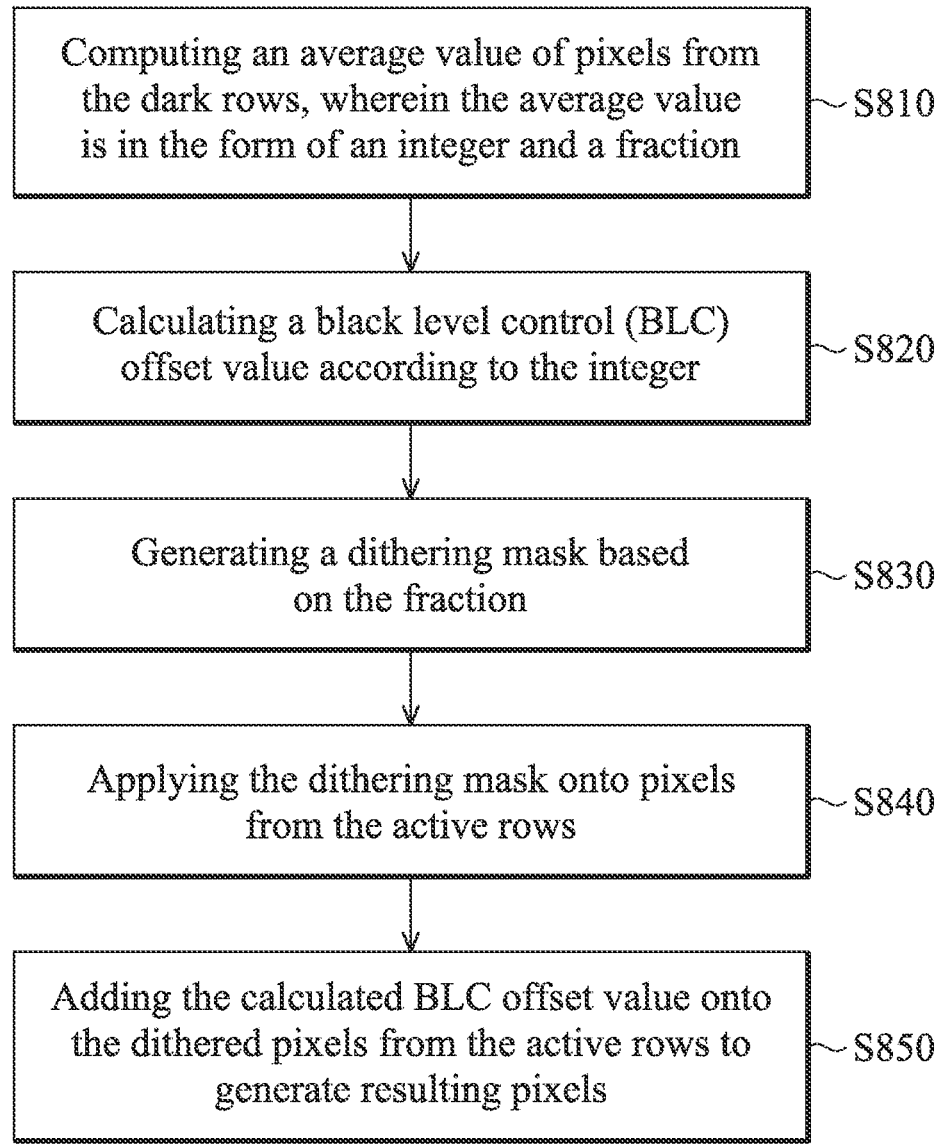
FIG. 8 illustrates a flow chart of the black level adjustment method for a CMOS image sensor with a pixel array according to an embodiment of the invention.

FIG. 8 illustrates a flow chart of the black level adjustment method for a CMOS image sensor with a pixel array according to an embodiment of the invention. Referring to both FIG. 2 and FIG. 8. The pixel array 20 may comprise dark rows 250 and active rows 260. In step S810, the computation unit 210 may compute an average value of pixels from the dark rows 250, wherein the average value is in the form of an integer and a fraction. In step S820, the computation unit 210 may further calculate a black level control offset value (i.e. BLC_offset) according to the integer. Specifically, the computation unit 210 may subtract the integer from the predetermined black level BLC_target to generate the black level control offset value. In step S830, the mask generation unit 220 may generate a dithering mask based on the fraction. In step S840, the dithering process unit 230 may apply the dithering mask (i.e. perform the dithering processing) to pixels from the active rows. In step S850, the offset calculating unit 240 may add the calculated BLC offset value to the dithered pixels to generate the resulting pixels Pa_blc (the adjusted pixels of the active rows).

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A black level adjustment method for a CMOS image sensor with a pixel array comprising dark rows and active rows, the method comprising the steps of:
   computing an average value of pixels from the dark rows, wherein the average value is in the form of an integer and a fraction;
   calculating a black level control (BLC) offset value according to the integer;
   generating a dithering mask based on the fraction;
   applying the dithering mask to pixels from the active rows; and
   adding the calculated BLC offset value to the dithered pixels from the active rows to generate resulting pixels.

2. The black level adjustment method as claimed in claim 1, wherein the step of computing the average value further comprises:
   calculating a summation value of the pixels of the dark rows; and
   dividing the summation value by a number of the pixels of the dark rows to generate the average value.

3. The black level adjustment method as claimed in claim 1, wherein the step of calculating the BLC offset value comprises:
   calculating the BLC offset value by subtracting the integer from a predetermined black level.

4. The black level adjustment method as claimed in claim 1, wherein the step of generating the dithering mask comprises:
   comparing the fraction with each element in a threshold map, respectively;
   if the element is smaller than the fraction, setting the corresponding element in the dithering mask to 1; and
   if the element is not smaller than the fraction, setting the corresponding element in the dithering mask to 0.

5. The black level adjustment method as claimed in claim 4, wherein the step of applying the dithering mask to the pixels from the active rows comprises:
   subtracting the corresponding element in the dithering mask from the pixels of the active rows to generate the resulting pixels.

6. A black level adjustment device for a CMOS image sensor with a pixel array comprising dark rows and active rows, comprising:
   a computation unit, coupled to the dark rows, for calculating the average value of pixels from the dark rows, wherein the average value is in the form of an integer and a fraction, and the computation unit further calculates a black level control (BLC) offset value according to the integer;
   a mask generation unit, coupled to the computation unit, for generating a dithering mask based on the fraction;
   a dithering processing unit, coupled to the mask generation unit and the active rows, for applying the dithering mask to pixels from the active rows; and
   an offset calculating unit, for adding the calculated BLC offset value to the dithered pixels from the active rows to generate the resulting pixels.

7. The black level adjustment device as claimed in claim 6, wherein the computation unit further calculates a summation value of the pixels of the dark rows, and divides the summation value by a number of the pixels of the dark rows to generate the average value.

8. The black level adjustment device as claimed in claim 6, wherein the computation unit further calculates the BLC offset value by subtracting the integer from a predetermined black level.

9. The black level adjustment device as claimed in claim 6, wherein the mask generation unit further compares the fraction with each element in a threshold map, respectively, wherein if the element is smaller than the fraction, the mask generation unit sets the corresponding element in the dithering mask to 1, and if the element is not smaller than the fraction, the mask generation unit sets the corresponding element in the dithering mask to 0.

10. The black level adjustment device as claimed in claim 9, wherein the dithering processing unit further subtracts the corresponding element in the dithering mask from the pixels of the active rows to generate the resulting pixel.

* * * * *